United States Patent
Gelis et al.

(10) Patent No.: US 10,221,466 B2
(45) Date of Patent: Mar. 5, 2019

(54) MOLYBDENUM RECOVERY FROM AQUEOUS NITRIC ACID SOLUTION BY SOLVENT EXTRACTION

(71) Applicants: Artem V. Gelis, Naperville, IL (US); Michael Alexander Brown, Chicago, IL (US)

(72) Inventors: Artem V. Gelis, Naperville, IL (US); Michael Alexander Brown, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 745 days.

(21) Appl. No.: 14/819,105

(22) Filed: Aug. 5, 2015

(65) Prior Publication Data

US 2017/0037492 A1 Feb. 9, 2017

(51) Int. Cl.
| | | |
|---|---|---|
| C22B 34/34 | (2006.01) | |
| C22B 3/38 | (2006.01) | |
| C22B 3/06 | (2006.01) | |
| C22B 3/26 | (2006.01) | |

(52) U.S. Cl.
CPC ............ *C22B 34/34* (2013.01); *C22B 3/0005* (2013.01); *C22B 3/0067* (2013.01); *C22B 3/0068* (2013.01); *C22B 3/065* (2013.01); *Y02P 10/234* (2015.11)

(58) Field of Classification Search
CPC ..................................... C22B 34/34
See application file for complete search history.

(56) References Cited

U.S. PATENT DOCUMENTS

| | | | | |
|---|---|---|---|---|
| 3,821,351 A | * | 6/1974 | Lucid | C01B 25/238 423/139 |
| 4,834,951 A | * | 5/1989 | Schwab | C22B 3/0024 204/DIG. 13 |
| 4,975,253 A | * | 12/1990 | Monzyk | C01G 51/003 210/688 |
| 5,260,039 A | * | 11/1993 | Schwab | C22B 3/165 423/109 |
| 8,354,085 B1 | | 1/2013 | Guelis | |

\* cited by examiner

*Primary Examiner* — Melissa S Swain
(74) *Attorney, Agent, or Firm* — Cherskov Flaynik & Gurda, LLC

(57) ABSTRACT

The invention provides a method for extracting transition metals, the method comprising supplying a feedstream containing transition metal, mixing the feedstream with nitric acid for a time and at a concentration sufficient to form an aqueous phase containing the transition metal, combining the aqueous phase with organic extractant phase for a time and at a concentration sufficient to cause the transition metal to reside within the organic extractant phase, and combining the transition metal-containing organic extractant phase with an hydroxamic acid-containing aqueous phase at a concentration and for a time sufficient to cause the transition metal to reside in the hydroxamic acid-containing aqueous phase.

16 Claims, 1 Drawing Sheet

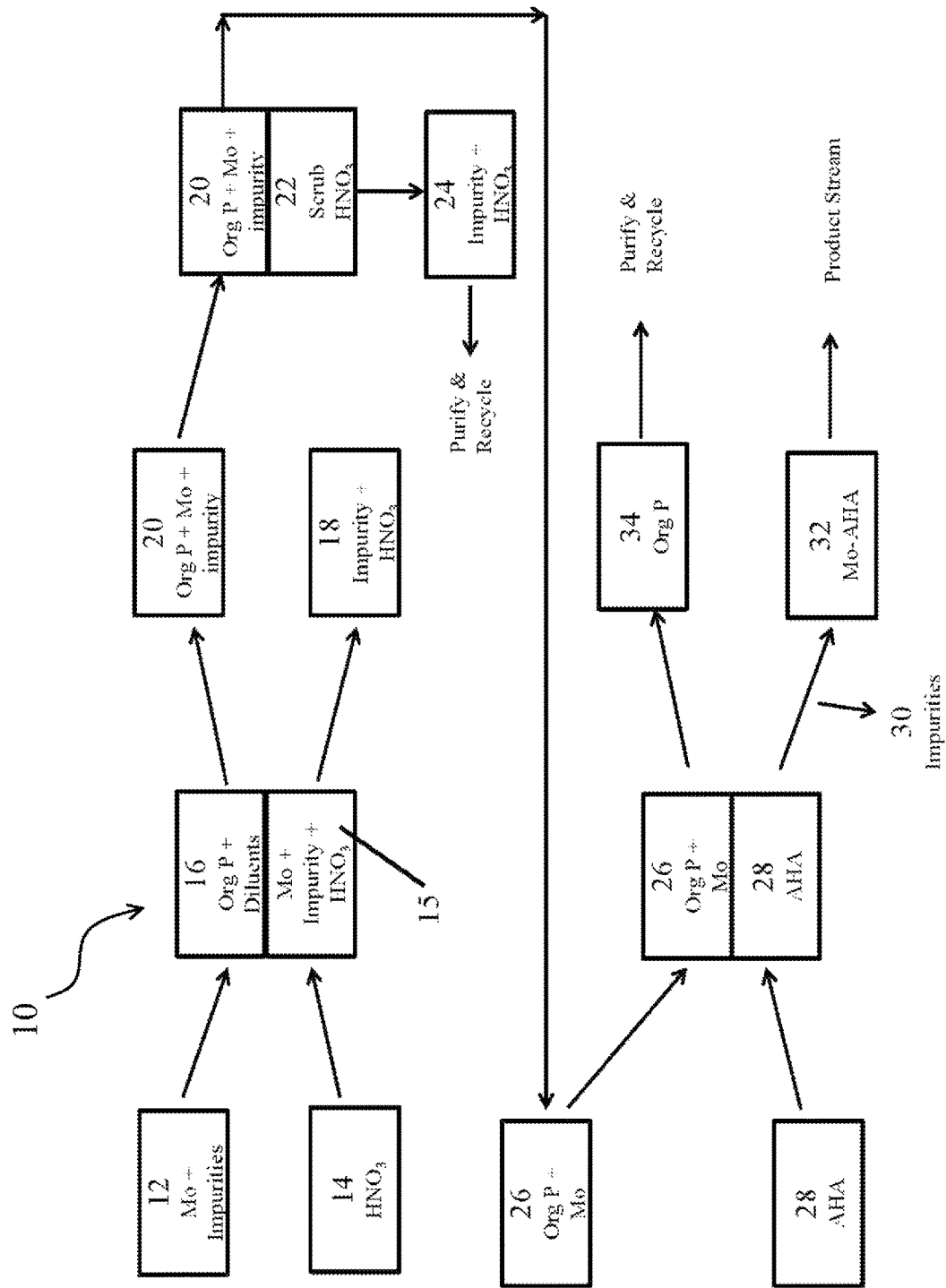

MOLYBDENUM RECOVERY FROM AQUEOUS NITRIC ACID SOLUTION BY SOLVENT EXTRACTION

CONTRACTUAL ORIGIN OF THE INVENTION

The U.S. Government has rights in this invention pursuant to Contract No. DE-AC02-06CH11357 between the U.S. Department of Energy and UChicago Argonne, LLC, representing Argonne National Laboratory.

BACKGROUND OF THE INVENTION

1. Field of the Invention

This invention relates to the recovery of transition metals and more specifically, this invention relates to the recovery and purification of transition metals from nitric acid liquors.

2. Background of the Invention

Transition metals are important adjuncts in a myriad of endeavors, including metallurgical applications, catalysts, and nuclear medicine. For example, molybdenum is used in the radiopharmaceutical industry as a source for 99Mo/99mTc generators. Sources of transition metals include natural resources (ores), fission products, or irradiated medical waste streams.

Mo-99 can be generated by (n,γ) reaction from enriched Mo-98 in a nuclear reactor, or by (γ,n) reaction from enriched Mo-100 using a particle accelerator. Also, Mo-99 can be produced through fission of U-235.

Several methods exist to recover metals from low concentration feeds, including ion exchange and solvent extraction. However, given that mining and metal recovery is associated with highly variable feed solutions, the impurities associated with some feed streams can foul ion exchange resins.

Current methods for harvesting transition elements from ores include the use of sulfuric acid and hydrochloric acid and sulfate solutions to generate pregnant leach solutions. Both sulfuric and hydrochloric acids are very aggressive media that may dissolve stainless steel equipment. Therefore, extractions are typically conducted at positive pH values to minimize the corrosion. However, these positive pH extraction protocols often confound extraction attempts from liquors having negative pH values.

These methods also utilize very alkaline inorganic stripping reagents such as ammonium hydroxide and/or sodium hydroxide at pHs ranging from about 5 to 11. These reagents are extremely corrosive and therefore dangerous to personnel, and damaging to equipment. There are also environmental risks associated with the generation of secondary waste streams containing such caustic fluids.

Other protocols require complex extraction liquors. For example, one or more organic complexing agents are often required to be combined with a plurality of extractants to effect harvesting of targeted metals. These combined solvent systems are complex to implement and also costly. Also, these combined solvent systems co-extract different metals or classes of metals simultaneously, such as Lanthanides and Actinides. Lastly, many of these combined solvent systems are utilized to treat nuclear fuel, which contains unusable forms transition metals.

High temperature roasting is another way to harvest certain transition metals, such as molybdenum. High temperature (approximately 500° C. to 600° C.) furnaces can remove sulfur from sulfuric acid/Molybdenum liquors and change the chemical form of molybdenum. But such high temperature operations create additional risks, and also are expensive.

A need exists in the art for a method for isolating transition metals present in a myriad of concentrations (e.g., from about 1 pM to about 600 mM) for a variety of feed streams. The method should be environmentally friendly and safe to personnel. Furthermore, the method should also utilize an aqueous acid phase and an organic phase wherein the acid confers resistance to corrosion of extraction hardware. The method should supply relatively pure metal (above 95 percent) in a final aqueous phase.

SUMMARY OF INVENTION

An object of the invention is to provide an oil and acid extraction system as an efficient method to isolate transition metals.

Another object of the invention is to provide a method for harvesting and purifying transition metals, such as molybdenum. A feature of the invention is that a single organic phase extractant harvests the transition metals from a wide range of concentrations (about 0.01 M to about 10 M) of nitric acid. An advantage of the invention is that at least about 97 percent of the transition metal is extracted into the organic layer in a single extraction step.

Still another object of the present invention is to provide a protocol for efficiently extracting molybdenum from a nitric acid feed stream. A feature of the invention is that large concentrations (e.g., up to about 0.6 mol/L) of Mo can be dissolved in nonalkaline, yet moderately acidic process solutions, such as about 1 molar to about 5 molar nitric acid and organo-phosphoric/phosphonic acids at pHs ranging from about 2 to about 5. An advantage of the invention is that relatively inexpensive and non-corrosive chemicals are utilized. Another advantage is that the protocol applies to virtually all commercial processes that involve recovering molybdenum, with a quick processing time and a large product through-put.

Yet another object of the invention is to provide a method for producing purified molybdenum. A feature of the invention is dissolving molybdenum-containing ore in nitric acid prior to extracting the molybdenum using first an organic extractant and then, second an aqueous complexing agent. An advantage of the method is that approximately 99 percent of impurities in the feedstream are removed after a single treatment with the first extractant. Another advantage is that the low boiling point (e.g., below about 100° C.) of the complexing agent allows its removal from the product liquor at lower temperatures and at ambient pressures, thereby producing a more purified product salt.

Briefly, the invention provides a method for extracting transition metals, the method comprising supplying a feedstream containing transition metal, mixing the feedstream with nitric acid for a time and at a concentration sufficient to form an aqueous phase containing the transition metal, combining the aqueous phase with organic extractant phase for a time and at a concentration sufficient to cause the transition metal to reside within the organic extractant phase, and combining the transition metal-containing organic extractant phase with an hydroxamic acid-containing aqueous phase at a concentration and for a time sufficient to cause the transition metal to reside in the hydroxamic acid-containing aqueous phase.

BRIEF DESCRIPTION OF DRAWING

The invention together with the above and other objects and advantages will be best understood from the following detailed description of the preferred embodiment of the invention shown in the accompanying drawings, wherein:

FIG. 1 is a flow chart of a transition metal extraction protocol, in accordance with features of the present invention.

DETAILED DESCRIPTION OF THE INVENTION

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

If a metal is going to be removed from an ore, it will most likely be done so using concentrated acid (negative pH). This aligns with the invented extraction process which works in a wide range of concentrations, (e.g., from about 0.01 M to about 10 M) which includes negative pHs. (Generally negative pH exists at above about 1 M acid concentrations.).

The invention provides a method of transition metal recovery from aqueous nitric acid solutions by solvent extraction. Therefore, the invented protocol is optimized for use with stainless steel hardware and componentry. Exemplary transition metals include, but are not limited to Mo, Ti, Zn, and Sn. As an example of the utility of the invented method, the inventors have demonstrated the efficient isolation and harvesting of purified molybdenum from ores and nuclear medicine waste streams. Generally, feed stream concentrations of transition metals of between about 1 pM to about 600 mM can be processed, preferably between about 1 nanoMolar (nM) to about 300 milliMolar (mM), and most preferably between about 1 mM and 300 mM.

FIG. 1 is a flow chart of an embodiment of a method, designated as numeral 10, for isolating and extracting molybdenum. A salient feature of the invention is its capability for accommodating a myriad of molybdenum-containing feedstreams, such as ores and nuclear medicine remnants. These feedstreams, generally designated as numeral 12 are first mixed with nitric acid 14 to create a mixture 15. As noted supra, the use of nitric acid is advantageous inasmuch as it is not corrosive to typical extraction equipment.

The now established molybdenum-nitric acid mixture 15 is combined with a phosphorous containing extractant/diluent phase in a single step 16. In an embodiment of the invention, the concentration of molybdenum in organic phase is not higher than 0.2 Molar, and preferably not higher than 0.15 M. This single extraction results in approximately 99 percent removal of any impurities in the initial Mo-containing feedstream 12 forming a raffinate 18. Such impurities include sulfur, palladium noble metals, precious metals, rhenium, and combinations thereof. Suitable phosphorous-containing extractants include, but are not limited to organo-phosphoric acids, organo-phosphonic acids, and combinations thereof. Generally, weaker organo-phosphorous-based acids (e.g. phosphinic acid) are not preferred inasmuch as such weak acids generate third phases. Such precipitates can complicate the process and otherwise confound purification steps downstream.

Suitable diluents to the extractants are high flashpoint (e.g., above about 70° C.) ones. Such suitable diluents include inert water-immiscible organic solvents, such as aliphatic and aromatic hydrocarbon solvents, including but not limited to kerosene, dodecane, octanol, and combinations thereof.

At this juncture in the process, the remainder of the process feedstream comprises a Mo-containing extract 20 in organic phase. This organic phase 20 is then subjected to a nitric acid scrubbing step 22. This scrubbing step results in the formation of a still purer molybdenum-organic phase 26 and another impurity-containing raffinate 24. Optionally, the Mo-containing extract can be scrubbed several times with nitric acid of the same concentration range. This further simplifies the extraction protocol.

An advantage of the method is providing reclaimed molybdenum in an aqueous phase. Aqueous product solutions allow the Mo to be easily modified to obtain the desired form of Mo. Therefore, the now purified molybdenum-organic phase, containing at least 99 percent pure molybdenum, is subjected to an aqueous extraction step 28 by combining the organic phase with an aqueous hydroxamic acid mixture. Suitable hydroxamics include, but are not limited to acetohydroxamic acid (AHA), Aminohydroxamic acids, dihydroxamic acids, and combinations thereof. Surprisingly and unexpectedly, the inventors found that the selectivity of AHA for Mo, combined with its lower boiling point and high solubility with water, makes AHA a preferred stripping agent in Mo-harvesting efforts.

The aqueous extraction step yields an aqueous phase containing molybdenum salts 32, such as molybdenyl, molybdenyl-AHA complexes, Mo-Blue, and combinations thereof. This extraction step further generates a third impurity-containing raffinate, 30, this one in the organic phase. The organo-phosphorous extractant remainder 34 is then purified and recycled.

Nitric Acid Detail

The invention's utilization of strong nitric acid feed streams provides two benefits:

1) Compared to other acids, nitric acid prevents corrosion of stainless steel equipment such as stainless steel centrifugal contactors, mixer-settlers and other solvent extraction industrial equipment. The inventors surmise that the nitrate moiety oxidizes the surface of the hardware to form a surface oxide protective film.

2) The use of nitric acid prevents precipitation of the target metal during the extraction process. This feature of preventing precipitation optimizes the solvent extraction process (particularly in large scale operations) inasmuch as every constituent in the reaction liquor remains in liquid phase. Thus, no filtration steps or equipment are required to remove entrained solids.

Concentrations and purity of nitric acid can vary. For example, molarities of between about 0.05 and 10 M are suitable, with molarities between about 2 and 4 M preferable if concentrated Mo solutions are used, and molarities of about 3 M most preferable. Temperatures of between about 10° C. and about 40° C. are also suitable, with ambient temperatures typical.

Preferably, molybdenum concentration does not exceed about 0.2 M in the range of nitric acid concentrations specified in this paragraph. Finally, purity of the nitric acid is not crucial as long as any impurities do not compound the separation and purification process of the invented method.

The nitric acid pHs and concentrations utilized by the invented method allow it to process mainly alkaline-based feed streams of state of the art nuclear fuel processors. For example, it is preferred that hydroxide-based feed streams be diluted with 4-5 M nitric acid, as long as the final nitric acid concentration is approximately 3 M.

The use of nitric acid is relevant to providing alternatives to existing recovery methods. For example, large scale commercial operations often use alkaline schemes for separation of $^{99m}$Tc from $^{99}$Mo after irradiation of either enriched $^{100}$Mo or $^{98}$Mo. These isotopes need to be recovered due to the high cost of the enrichment process. The instant protocol allows for acidification of the Mo-containing stream in nitric acid in preparation of using the invented solvent extraction recovery method. (Thus, the instant protocol does not utilize concentrated hydrochloric acid in solvent extraction recovery by tri-butyl phosphate (TBP) dissolved either in octanol or tetrachloroethylene. Unlike nitric acid, HCl causes significant corrosion of stainless steel equipment. Instead, the use of HCl would require hardware comprising very expensive alloys, ceramics or plastics, none of which is practical for nuclear technologies.

The use of nitric acid can also optimize Mo recovery from uranium targets. After irradiation of uranium targets in a nuclear reactor to product Mo, the target can be dissolved in strong nitric acid. The uranium is easily recovered by extracting it in TBP, followed by Mo extraction from the nitric acid raffinate.

Nitric acid solvation maximizes Mo recovery from uranyl nitrate/nitric acid solution reactors. Mo can be produced by fission of uranium in nitric acid solution. A wide range of concentrations of nitric acid discussed herein can facilitate this recovery. Uranyl nitrate is recovered and recycled via solvent extraction with TBP, followed by Mo recovered from the nitric acid raffinate. Strong concentrations of nitric acid also mitigate the formation of peroxides. (Peroxides have the potential to precipitate uranium during irradiations and this proves problematic for state of the art solution reactors.)

Mo recovery from natural resources is enhanced using the invented method. State of the art technologies utilized sulfuric acid as an aqueous medium for Mo processing from ores. This is followed by high temperature treatments. These state of the art protocols present serious corrosion issues and therefore high cost of materials and equipment. The use of nitric acid minimizes the reprocessing costs, and removes the need for high-temperature processing. Environmental risks are also minimized.

Extractant/Complexing
Agents Detail

A myriad of solvents are suitable organic extractants for use in the invented protocol, those solvents including phosphorous containing compounds such as, but not limited to, Di-(2-ethylhexyl) phosphoric acid (HDEHP), 2-ethylhexyl-phos-phoric acid mono-2-ethylhexyl ester (HEHEHP), Bis (2,4,4-trimethylpentyl)phosphinic acids (such as Cyanex 272® and Cyanex 572® from Cytec Industries, Inc, Woodlawn Park, N.J.), and combinations thereof.

The distribution ratios for Mo for the extraction regime (the ratios defined as the concentration of organic phase divided by the concentration of the aqueous phase, i.e., [organic phase-Mo]/[aqueous phase-Mo]) in step 16 are in the 5-300 range depending on the extractant concentrations. The higher the number, the more targeted transition metal is extracted in the organic extraction step 16.

The distribution ratios for the stripping regime, step 28 are in the range of 0.01 (for AHA) to 0.5 depending on the composition of the strip. For example, a 0.01 ratio means that 99 percent of the targeted transition metal falls out of the organic phase to reside in the aqueous phase.

The whole process can be done using only 6-8 counter current solvent extraction stainless steel stages. Stainless steel can be utilized with impunity given the relatively noncaustic nature of the nitric acid, even at molarities exceeding 3-4.

Example 1

Mo can be extracted by 2-ethyl(hexyl)phosphonic acid mono-2-ethylhexyl ester (HEH[EHP]), dissolved in kerosene or other common diluents, from 0.01-5 M range of nitric acid concentration. Other acidic extractants as di-2-ethylhexyl phosphoric acid (aka HDEHP or D2EHPA), Cyanex 572 or Cyanex 272 can be used as well. Preferably, Mo concentration does not exceed 0.2 M in the range of $HNO_3$ concentrations specified above.

Then the organic phase is scrubbed with nitric acid of the same concentration range a few times, followed by Mo strip into aqueous phase using complexing agents or holdback reagents. Suitable such agents/reagents include those containing citric acid, acetohydroaxamic acid (AHA), polyoxocarboxalic acids, other chelating agents and combinations thereof.

In summary, the invention provides a method for using moderate nitric acid, organo-phosphoric or organo-phosphonic acids and hydroxamic acids for the extraction and purification of transition metals from a natural resource ore, or from a toxic secondary waste stream such as what is generated in nuclear medicine product and waste streams. The method uses relatively mild reactants to accommodate worker safety and existing infra structure, yet in concentrations to process highly alkaline feed streams which are generated from state of the art processes.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for extracting transition metals, the method comprising:
   a supplying a feed stream containing transition metal;
   b mixing the feed stream with nitric acid for a time and at a concentration sufficient to form an aqueous phase containing the transition metal;
   d combining the aqueous phase with organic extractant phase for a time and at a concentration sufficient to cause the transition metal to reside within the organic extractant phase; and
   e combining the transition metal-containing organic extractant phase with an hydroxamic acid-containing aqueous phase at a concentration and for a time sufficient to cause the transition metal to reside in the hydroxamic acid-containing aqueous phase; wherein the transition metal is a metal selected from the group consisting of Mo, Ti, Zn, or Sn.

2. The method as recited in claim 1 wherein the step of combining the aqueous phase with organic extractant phase causes at least about 96 percent of impurities within the feed stream to reside in the aqueous phase.

3. The method as recited in claim 1 wherein the step of combining the metal-containing organic extractant phase with an hydroxamic acid causes impurities to remain in the organic extractant phase.

4. The method as recited in claim 1 wherein the transition metal residing in the hydroxamic acid-containing aqueous phase is a cation of a salt or a molybdenum-AHA complex.

5. The method as recited in claim 1 wherein the ratio of concentration of nitric acid to transition metal is between 1 and 10.

6. The method as recited in claim 1 wherein the ratio of concentration of organic extractant to transition metal is between 1 and 5.

7. The method as recited in claim 1 wherein the ratio of concentration of hydroxamic acid to transition metal is between 1 and 10.

8. The method as recited in claim 1 wherein the transition metal is molybdenum.

9. The method as recited in claim 1 wherein the molarity of nitric acid is between 0.1 M and 10 M.

10. The method as recited in claim 1 wherein the transition metal containing organic extractant phase is scrubbed with nitric acid.

11. The method as recited in claim 1 wherein the hydroxamic acid is acetohydroxamic acid, or aminohydroxamic acid, or dihydroxamic acids or combinations thereof.

12. The method as recited in claim 1 wherein the feed stream is a molybdenum feedstock selected from the group consisting of ore, medical isotope irradiation waste streams, and combinations thereof.

13. The method as recited in claim 1 wherein the organic extractant is a phosphorous-containing compound selected from the group consisting of organo-phosphoric acid, organo-phosphonic acid, and combinations thereof.

14. The method as recited in claim 1 wherein the hydroxamic acid has a pH of between approximately 2 and 5.

15. The method as recited in claim 1 wherein the combining the transition metal-containing organic extractant phase with an hydroxamic acid-containing aqueous phase step occurs in at an AHA stripping pH no lower than 2.

16. The method as recited in claim 1 wherein the concentration of transition metal is between approximately $1\times10^{-12}$ M and approximately $6\times10^{-1}$ M.

* * * * *